United States Patent
Kang et al.

(10) Patent No.: US 12,290,933 B2
(45) Date of Patent: May 6, 2025

(54) METHOD AND APPARATUS FOR AUTOMATICALLY RECOGNIZING LOCATION OF OBJECT

(71) Applicant: ELECTRONICS AND TELECOMMUNICATIONS RESEARCH INSTITUTE, Daejeon (KR)

(72) Inventors: Hyun Chul Kang, Daejeon (KR); Min Gi Kim, Daejeon (KR); Ji Yeon Son, Daejeon (KR); Hyonyoung Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 304 days.

(21) Appl. No.: 17/876,653

(22) Filed: Jul. 29, 2022

(65) Prior Publication Data
US 2023/0059054 A1     Feb. 23, 2023

(30) Foreign Application Priority Data

Aug. 19, 2021 (KR) ................ 10-2021-0109566
Jun. 28, 2022 (KR) ................ 10-2022-0078957

(51) Int. Cl.
*B25J 9/16*     (2006.01)
*G06T 7/11*    (2017.01)
(Continued)

(52) U.S. Cl.
CPC ........... *B25J 9/1669* (2013.01); *B25J 9/1661* (2013.01); *B25J 9/1697* (2013.01); *G06T 7/11* (2017.01);
(Continued)

(58) Field of Classification Search
CPC ...... B25J 9/1661; B25J 9/1669; B25J 9/1697; G05B 2219/40543; G06T 7/11;
(Continued)

(56) References Cited

U.S. PATENT DOCUMENTS 9,364,865 B2     6/2016   Kim
10,583,560 B1 *  3/2020   Rodrigues ............. B25J 9/1661
(Continued)

FOREIGN PATENT DOCUMENTS

JP    2017-087326 A    5/2017
JP    2019-084601 A    6/2019

OTHER PUBLICATIONS

Kang, Hyunchul, et al. "HSV Color Space Based Robot Grasping for Personalized Manufacturing Services." 2019 International Conference on Information and Communication Technology Convergence (ICTC). IEEE, 2019.*

(Continued)

*Primary Examiner* — Jason Holloway
*Assistant Examiner* — Blake A Wood
(74) *Attorney, Agent, or Firm* — LRK PATENT LAW FIRM

(57) ABSTRACT

A method for automatically recognizing a location of an object so that a robot can grasp and transfer the product in an apparatus for automatically recognizing a location of an object is provided. The method for automatically recognizing a location of an object obtains one frame from image data of the product produced by the manufacturing facility, detects location and shape information of the product based on a hue, saturation, value (HSV) color space using the frame, generates a recipe for the robot to grasp and transfer the product based on the location and shape information of the product, and transmits the recipe to the robot.

17 Claims, 18 Drawing Sheets

(51) Int. Cl.
  *G06T 7/62*   (2017.01)
  *G06T 7/73*   (2017.01)
  *G06V 10/20*  (2022.01)
  *G06V 10/25*  (2022.01)
  *G06V 10/26*  (2022.01)
  *G06V 10/56*  (2022.01)

(52) U.S. Cl.
  CPC .............. *G06T 7/62* (2017.01); *G06T 7/74* (2017.01); *G06V 10/25* (2022.01); *G06V 10/255* (2022.01); *G06V 10/267* (2022.01); *G06V 10/56* (2022.01); *G06V 2201/06* (2022.01)

(58) Field of Classification Search
  CPC .... G06T 7/62; G06T 7/73; G06T 7/74; G06T 2207/10024; G06V 10/25; G06V 10/255; G06V 10/267; G06V 10/56; G06V 2201/06
  See application file for complete search history.

(56) References Cited

U.S. PATENT DOCUMENTS

| | | | |
|---|---|---|---|
| 2010/0134632 A1 | 6/2010 | Won et al. | |
| 2010/0316287 A1* | 12/2010 | Duong | G06F 18/2135 382/164 |
| 2015/0063688 A1* | 3/2015 | Bhardwaj | G06T 11/60 382/159 |
| 2016/0224858 A1* | 8/2016 | Chen | G06V 20/64 |
| 2016/0371634 A1* | 12/2016 | Kumar | G06V 10/462 |
| 2017/0103258 A1* | 4/2017 | Yu | G06V 10/82 |
| 2017/0129101 A1 | 5/2017 | Sonoda | |
| 2019/0126471 A1 | 5/2019 | Kobayashi et al. | |
| 2021/0073558 A1* | 3/2021 | Li | G05D 1/0212 |
| 2021/0086364 A1 | 3/2021 | Handa et al. | |
| 2022/0215201 A1* | 7/2022 | Dwivedi | G06N 3/045 |

OTHER PUBLICATIONS

Vikram, Tadmeri Narayan, Marko Tscherepanow, and Britta Wrede. "A saliency map based on sampling an image into random rectangular regions of interest." Pattern Recognition 45.9 (2012): 3114-3124.*

Bora, Dibya Jyoti, Anil Kumar Gupta, and Fayaz Ahmad Khan. "Comparing the performance of L* A* B* and HSV color spaces with respect to color image segmentation." arXiv preprint arXiv:1506.01472 (2015).*

Maharana, Anmol, Smita Pradhan, and Dipti Patra. "Elliptical region of interest based saliency detection." 2017 14th IEEE India Council International Conference (INDICON). IEEE, 2017.*

Ganesan P, et al., "HSV Color Space Based Segmentation of Region of Interest in Satellite Images", 2014 International Conference on Control, Instrumentation, Communication and Computational Technologies (ICCICCT).

Hyun-Chul Kang, et al. "HSV Color-Space-Based Automated Object Localization for Robot Grasping without Prior Knowledge", Appl. Sci. 2021, 11, 7593. https://doi.org/10.3390/app11167593.

* cited by examiner

FIG. 6

| Algorithm of Auto HSV Color Picking |
|---|
| Configuration of $ROI_{max\_region}$ |
|     Set $ROI_{max\_region}$ location info from bounding box (x_start, y_start, x_end, y_end) |
| Input Video from Vision camera |
| Video to image frame conversion |
| Set $ROI_{ref\_region}$ location info from bounding box (x_start, y_start, x_end, y_end) |
| $ROI_{ref\_region}$ → Transformation from RGB to HSV |
| Picking automated HSV Color Extraction (HSV values) from $ROI_{ref\_region}$ |
| Registration color threshold of $ROI_{ref\_region}$ |
|     Set H, S, V upper and lower bound threshold, $ROI_{ref\_region}$ location |

FIG. 8

---
Algorithm of ROI Random Sampling and Similarity Comparison
---
Start ROI Random Sampling and Similarity Comparison in $ROI_{max\_region}$
    Set $ROI_{sampling\_max}$ = Max_sample_count
For $ROI_{sampling\_i}$ = 0: $ROI_{sampling\_max}$
    Extract Random $ROI_{sampling\_i}$ location info from bounding box (x_start, y_start, x_end, y_en
    $ROI_{sampling\_i}$ → Transformation from RGB to HSV
    Picking automated HSV Color Extraction (HSV values) from $ROI_{sampling\_i}$
    Compute HSV Color Similarity of $ROI_{ref\_region}$ between $ROI_{sampling\_i}$
        Retrieve HSV Color Values→(H1, S1, V1 of $ROI_{ref\_region}$ and H0, S0, V0 $ROI_{sampling\_i}$)
        Compute HSV Color Distance
    IF($Similarity_{threshold}$ > Distance) then
        Set HSV Upper(max) and Low(min) bound threshold from $ROI_{sampling\_i}$
        Add HSV value, Upper/Lower bound threshold of $ROI_{sampling\_i}$ in $ROI_{tempList}$
    Else
        $ROI_{sampling\_i}$ = $ROI_{sampling\_i}$ + 1
    IF($ROI_{sampling\_i}$ > Max_sample_count) then
        Action $ROI_{tempList}$ Merge Operation
    Else
        Continue:
End

FIG. 10

| Algorithm of ROI Merge Operation |
|---|
| Start ROI Merge Operation |
|     Set $ROI_{TempList\_i}$, Retrieve $ROI_{TempList\_max}$ |
|     Set $ROI_{TempList\_j} = 0$ |
| For i = 0: $ROI_{TempList\_max}$ |
|     Retrieve HSV Value, Upper and Lower threshold for $ROI_{TempList\_i}$ |
|     $ROI_{TempList\_i}$ → Image Masking According to Upper and Lower threshold |
|     Bit Operation $ROI_{ref\_region}$ and $ROI_{TempList\_i}$ |
|     Merge operation of $ROI_{ref}$ and $ROI_{TempList\_j}$ |
|     IF($ROI_{TempList\_j} > ROI_{TempList\_max}$) then |
|         Go to Automated Object Measurement |
|     Else |
|         $ROI_{TempList\_j} = ROI_{TempList\_j} + 1$ |
|         Continue; |
| End |

METHOD AND APPARATUS FOR AUTOMATICALLY RECOGNIZING LOCATION OF OBJECT

CROSS-REFERENCE TO RELATED APPLICATIONS

This application claims priority to and the benefit of Korean Patent Application No. 10-2021-01 09566 filed in the Korean Intellectual Property Office on Aug. 19, 2021, and Korean Patent Application No. 10-2022-0078957 filed in the Korean Intellectual Property Office on Jun. 28, 2022, the entire contents of which are incorporated herein by reference.

BACKGROUND OF THE INVENTION

1. Field of the Invention

The present disclosure relates to a method and apparatus for automatically recognizing a location of an object, and more specifically, to a method and apparatus for automatically recognizing a location of an object that recognize location of a product based on an HSV (Hue, Saturation, Value) color space for automating robot teaching tasks for product transport and picking of robots in a smart factory environment.

2. Description of Related Art

Smart Factory is evolving with intelligence by connecting all processes of production, distribution, service, and consumption by combining major technologies of ICT (Information and Communications Technology) such as the IoT (Internet of Things), robots, and AI (artificial intelligence).

In such a smart factory environment, whenever a product is changed, a lot of time and effort is consumed as a human performs a robot teaching work for product transfer and picking.

In order to respond quickly to flexible production environments and rapidly changing consumer demands, automation and intelligence that can operate on their own without human intervention is very important. However, in actual manufacturing sites with high variability, product detection based on HSV color space and robot machine vision requires human intervention and presets such as color specification for recognition, and setting of upper and lower thresholds of colors whenever a product is changed. In addition, product recognition has a lot of difficulty in accurately extracting product information due to various environmental factors such as noise around products, light reflection, and lighting interference.

SUMMARY OF THE INVENTION

The present disclosure has been made in an effort to provide a method and apparatus for automatically recognizing location of object capable of recognizing the location of an object without human intervention and prior knowledge in order to respond to a highly volatile environment change and automate the robot teaching task.

According to an exemplary embodiment, a method for automatically recognizing a location of an object so that a robot can grasp and transfer the object in an apparatus for automatically recognizing location of object is provided. The method for automatically recognizing a location of an object includes: obtaining one frame from image data of a product produced by the manufacturing facility; detecting location and shape information of the product based on a hue, saturation, value (HSV) color space using the frame; generating a recipe for the robot to grasp and transfer the product based on the location and shape information of the product; and transmitting the recipe to the robot.

The detecting may include: setting a reference region of interest (ROI) and a maximum ROI in the frame; searching random sampling ROIs having high HSV color similarity to the reference ROI by comparing HSV color values between a plurality of random sampling ROIs randomly sampled by a set number within the maximum ROI and the reference ROI, respectively; and generating one final product image by using the searched random sampling ROIs.

The searching may include: extracting the HSV color value of the reference ROI; extracting an HSV color value for each of the plurality of random sampling ROIs; calculating a distance between the HSV color value of the reference ROI and the HSV color value of each random sampling ROI; and determining random sampling ROIs having the calculated distance equal to or less than a predetermined similarity threshold as the random sampling ROIs having high HSV color similarity to the reference ROI.

The searching may include setting an HSV upper bound threshold value and an HSV lower bound threshold value for each of the HSV color values of the random sampling ROIs having high HSV color similarity to the reference ROI.

The generating may include: performing image masking according to the HSV upper bound threshold value and the HSV lower bound threshold value of the corresponding random sampling ROI, for each of the random sampling ROIs having high HSV color similarity to the reference ROI; and an operation and a merge operation on the image masked random sampling ROIs and the reference ROI.

The detecting may include calculating a size of the product from the product image.

The calculating the size of the product may include calculating width and height of the product by dividing a horizontal length and a vertical length of a bounding box representing the product in the product image by pixels per metric, respectively, and the pixel per metric may indicate a value obtained by dividing a width value of the product measured in the frame by a width value of the product measured in advance.

The detecting may further include, before the searching, converting the reference ROI in the frame from colors in an RGB color space to colors in an HSV color space.

According to another embodiment, an apparatus for automatically recognizing a location of an object that automatically recognizes a location of the object so that a robot can grasp and transfer the object is provided. The apparatus for automatically recognizing a location of an object includes: a data aggregator that collects image data of a product produced by a manufacturing facility; a data converter that obtains one frame from the image data; an object detector that detects the location of the product based on a hue, saturation, value (HSV) color space using the frame; and a data analyzer that extracts shape information of the product detected by the object detector.

The object detector may set a reference region of interest (ROI) and a maximum ROI in the frame, may search random sampling ROIs having high HSV color similarity to the reference ROI through comparison HSV color values between a plurality of random sampling ROIs randomly sampled by a set number within the maximum ROI and the reference ROI, and may generate one final product image by using the searched random sampling ROIs.

The object detector may calculate a distance between the HSV color value of the reference ROI and the HSV color value of each of the random sampling ROIs, and may determine random sampling ROIs having the calculated distance equal to or less than a predetermined similarity threshold as the random sampling ROIs having high HSV color similarity to the reference ROI.

The object detector may calculate the distance using the difference between the H color values of the reference ROI and each of random sampling ROIs, the difference between the S color values of the reference ROI and each of the random sampling ROIs, and the difference between the V color values of the reference ROI and each of the random sampling ROIs.

The object detector may set an HSV upper bound threshold value and an HSV lower bound threshold value for each of the HSV color values of the random sampling ROIs having high HSV color similarity to the reference ROI.

The object detector may perform image masking according to the HSV upper bound threshold value and the HSV lower bound threshold value of the corresponding random sampling ROI, for each of the random sampling ROIs having high HSV color similarity to the reference ROI, and may generate a binarized image for the product image by performing bit operation and merge operation on the image masked random sampling ROIs and the reference ROI.

The data analyzer may calculate a size of the product from the product image.

The object detector may convert the reference ROI in the frame from colors in an RGB color space to colors in an HSV color space before the comparison.

The apparatus for automatically recognizing a location of an object may further include a data controller that generates a recipe for the robot to grasp and transfer the product based on the location and shape information of the product, and controls the robot according to the recipe.

BRIEF DESCRIPTION OF THE DRAWINGS

FIG. 6 is an algorithm diagram illustrating a detailed flow of the HSV color selection step shown in FIG. 4.

FIG. 8 is an algorithm diagram for explaining the detailed flow of the ROI random sampling and HSV similarity comparison steps shown in FIG. 4.

FIG. 10 is an algorithm diagram illustrating a detailed flow of the ROI merging step shown in FIG. 4.

DETAILED DESCRIPTION OF THE EMBODIMENTS

Figure 1:
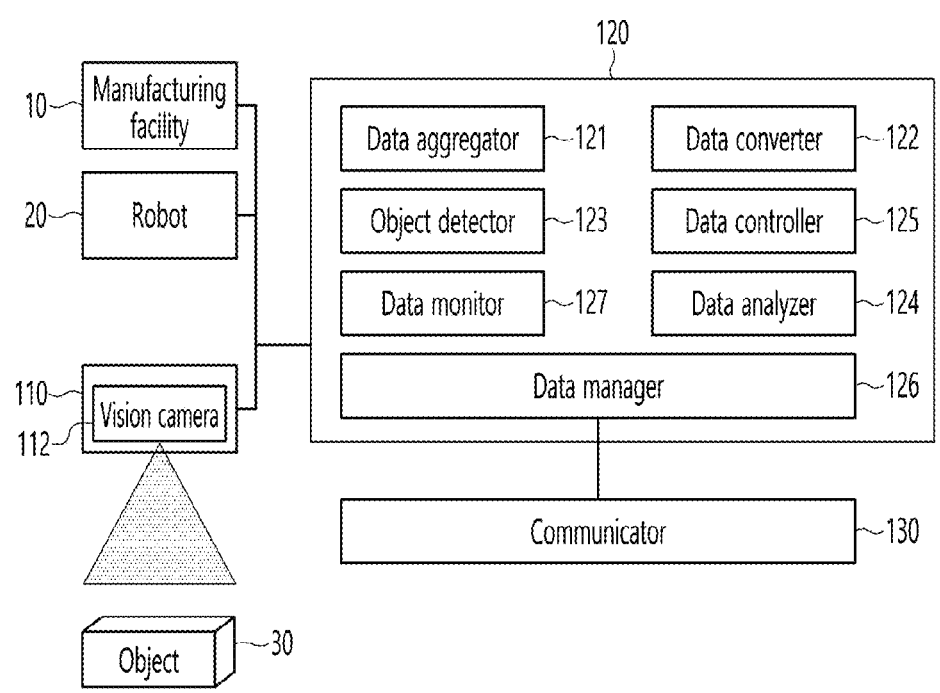
FIG. 1 is a diagram illustrating an apparatus for automatically recognizing location of object according to an exemplary embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. Accordingly, the drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Expressions described in the singular herein may be construed as singular or plural unless an explicit expression such as "one" or "single" is used.

As used herein, "and/or" includes each and every combination of one or more of the recited elements.

In this specification, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may also be referred to as a first element.

In the flowchart described with reference to the drawings in this specification, the order of operations may be changed, several operations may be merged, some operations may be divided, and specific operations may not be performed.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a method and apparatus for automatically recognizing location of object according to an embodiment of the present disclosure will be described in detail with reference to the drawings.

FIG. 1 is a diagram illustrating an apparatus for automatically recognizing a location of an object according to an exemplary embodiment.

Referring to FIG. 1, the apparatus for automatically recognizing a location of an object includes a sensor device 110, an object location recognizer 120, and a communicator 130.

The sensor device 110 may include various sensors such as a vision camera 112, a pressure sensor, an illuminance sensor, and the like.

The object location recognizer 120 includes a data aggregator 121, a data converter 122, an object detector 123, a data analyzer 124, a data controller 125, a data manager 126, and a data monitor 127.

The data aggregator 121 collects manufacturing resource data obtained from the sensor device 110 or the manufacturing facility 10. In particular, the data aggregator 121 collects image data of the product 30 produced from the manufacturing facility 10 through the vision camera 112.

The data converter 122 validates the data collected by the data aggregator 121 and performs data conversion. The data converter 122 may convert image data of the product 30 into a frame image.

The object detector 123 detects an object, that is, the product 30, using the frame image of the product 30 produced by the manufacturing facility 10, and detects location information of the detected product 30.

The data analyzer 124 extracts shape information of the product detected by the object detector 123. The shape information of the product 30 may include, for example, appearance, color, length information, and the like.

The data controller 125 controls the manufacturing facility 10. In addition, the data controller 125 generates a recipe for the grasping and transfer operation of the robot 20 based on the location information of the product 30 and the shape information of the product 30, and controls the robot 20 according to the recipe.

The data manager 126 manages and stores data of the manufacturing facility 10. Here, the data may include, for example, a process state of the manufacturing facility 10, a failure state, an identifier (ID), and the like.

The data monitor 127 monitors data of the manufacturing facility 10.

The communicator 130 may communicate with an external server (not shown). For example, data collected by the data aggregator 121 may be transmitted to an external server through the communicator 130.

Figure 2:
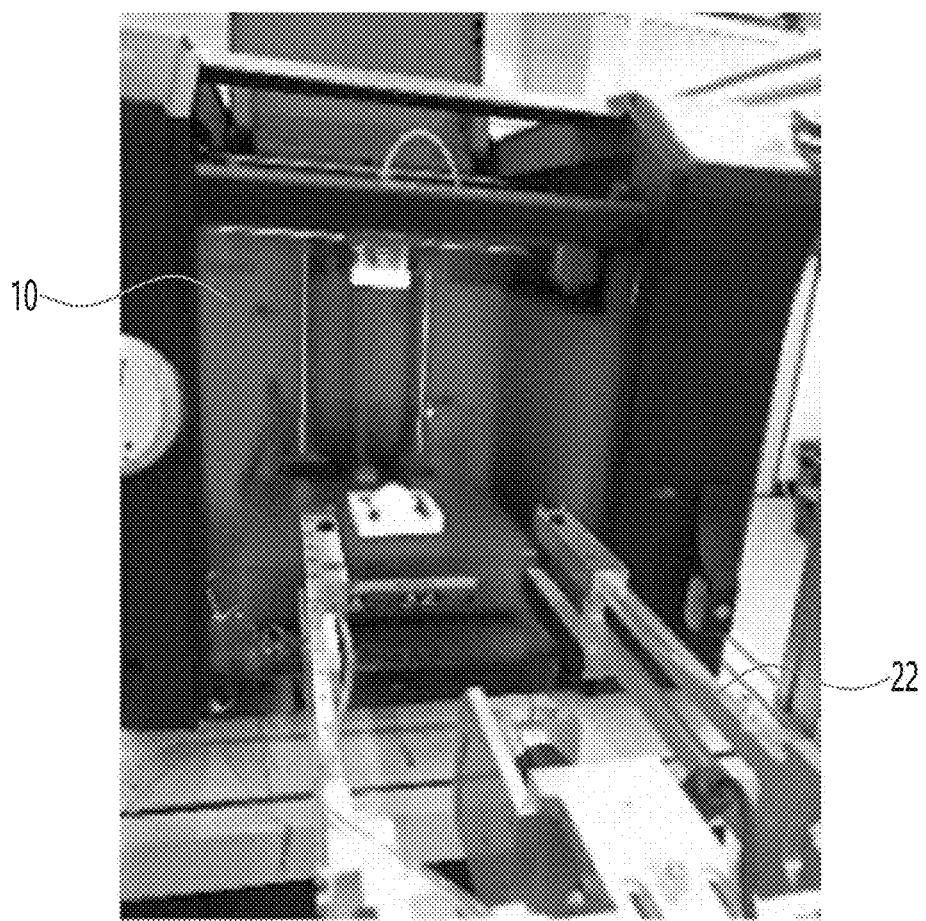
FIG. 2 is a diagram illustrating an application example of an apparatus for automatically recognizing a location of an object according to an embodiment.

FIG. 2 is a diagram illustrating an application example of an apparatus for automatically recognizing a location of an object according to an embodiment.

Referring to FIG. 2, the robot handler 22 corresponding to the robot 20 serves to transport the product. The manufacturing facility 10 is a facility for producing products, and may be, for example, a 3D printer.

The robot handler 22 grasps a product produced by the manufacturing facility 10 and transfers the product to the buffer process, which is the next process.

At this time, the apparatus for automatically recognizing a location of an object recognizes the location of the product by using the image data of the product that has been produced from the manufacturing facility 10, and controls the robot 20 according to the location of the product, so that the robot handler 22 can grasp the product.

The vision camera (112 in FIG. 1) may be mounted on the robot handler 22, and photographs images of a product that has been produced from the manufacturing facility 10.

Figure 3:
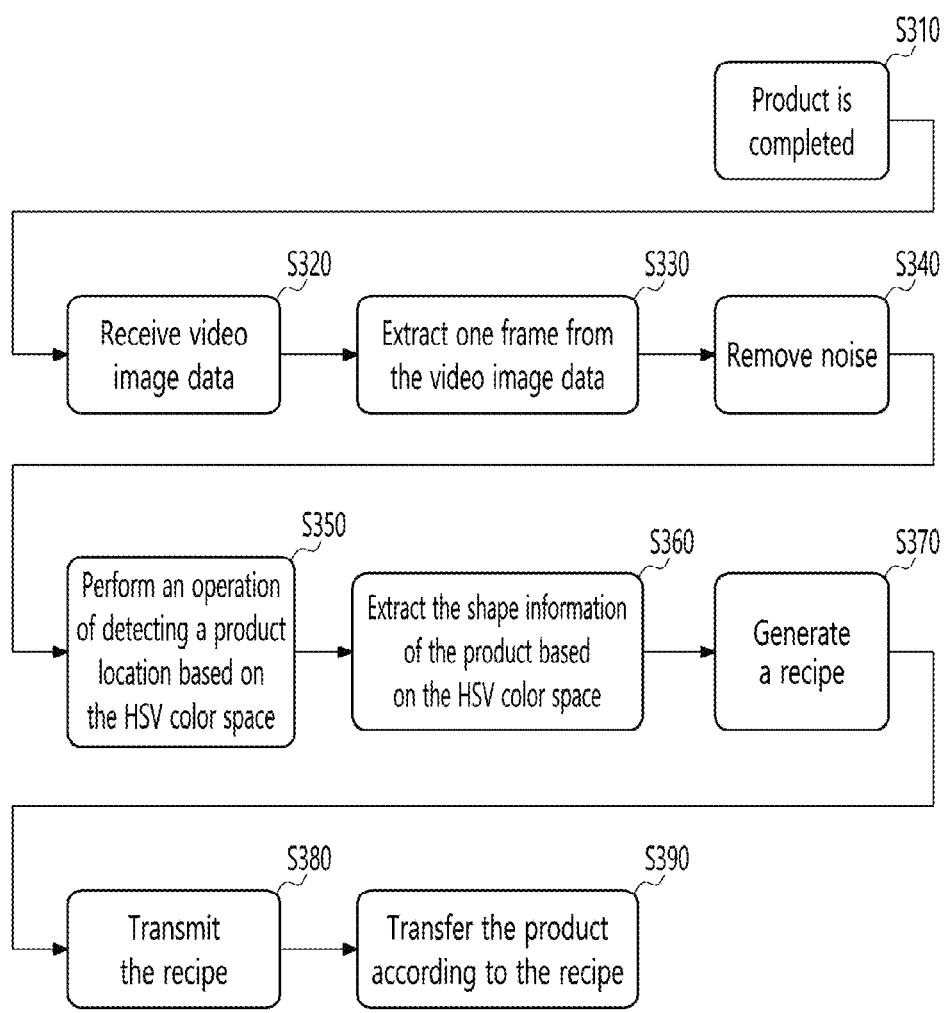
FIG. 3 is a flowchart illustrating a method of recognizing an object location when a robot handler transfers a product to a buffer process after a product is produced in a manufacturing facility.

FIG. 3 is a flowchart illustrating a method of recognizing an object location when a robot handler transfers a product to a buffer process after a product is produced in a manufacturing facility.

Referring to FIG. 3, when the product is completed (S310), the vision camera photographs the completed product. The video image data photographed by the vision camera is input to the apparatus for automatically recognizing a location of an object.

When the data aggregator 121 of the apparatus for automatically recognizing a location of an object receives the video image data photographed from the vision camera 112 (S320), the data converter 122 extracts one frame from a plurality of frames constituting the video image data (S330), and then removes noise from the one frame (S340). That is, when the completed product is photographed by the vision camera, the photographed video image data is substantially unchanged, so that the object location recognition procedure is performed using only one frame among a plurality of frames.

Next, the object detector 123 performs an operation of detecting a product location (object localization) based on the HSV color space from one frame (S350). The HSV color space is a method of expressing colors using hues (H), saturation (S), and value (V).

Next, the data analyzer 124 extracts the shape information of the product from one frame based on the HSV color space (S360). The data analyzer 124 may extract shape information of the product by using the result image detected by the object detector 123.

The data controller 125 generates a recipe for the grasping and transfer operation of the robot handler 22 based on the product location and shape information of the product (S370), and transmits the generated recipe to the robot handler 22 (S380).

The robot handler 22 grasps the product and transfers the product to the buffer process according to the recipe (S390).

Figure 4:
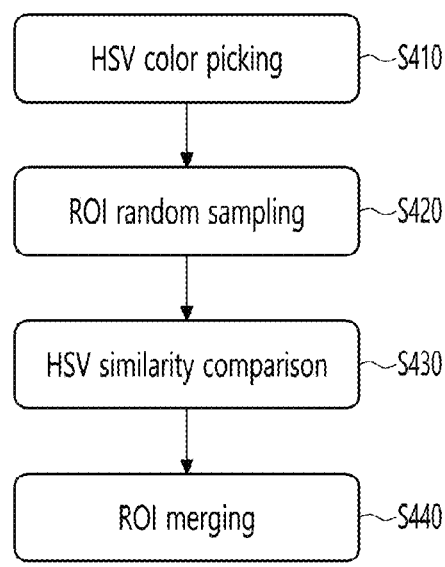
FIG. 4 is a flowchart schematically illustrating a method for detecting an object location of the object detector illustrated in FIG. 1.

FIG. 4 is a flowchart schematically illustrating a method for detecting an object location of the object detector illustrated in FIG. 1.

Referring to FIG. 4, the object location detection method of the object detector 123 may consist of a total of four steps (S410 to S440).

Step 1 (S410) is an HSV color picking step. The HSV color picking step is a process of extracting an HSV color value of a reference region of interest (ROI). Step 2 (S420) is an ROI random sampling step. Step 3 (S430) is a step of comparing HSV similarity. The step of comparing the HSV similarity is a process of comparing the HSV color similarity between the reference ROI and each random sampling ROI. Step 4 (S440) is an ROI merging step. A detailed description of each step will be described later.

Figure 5:
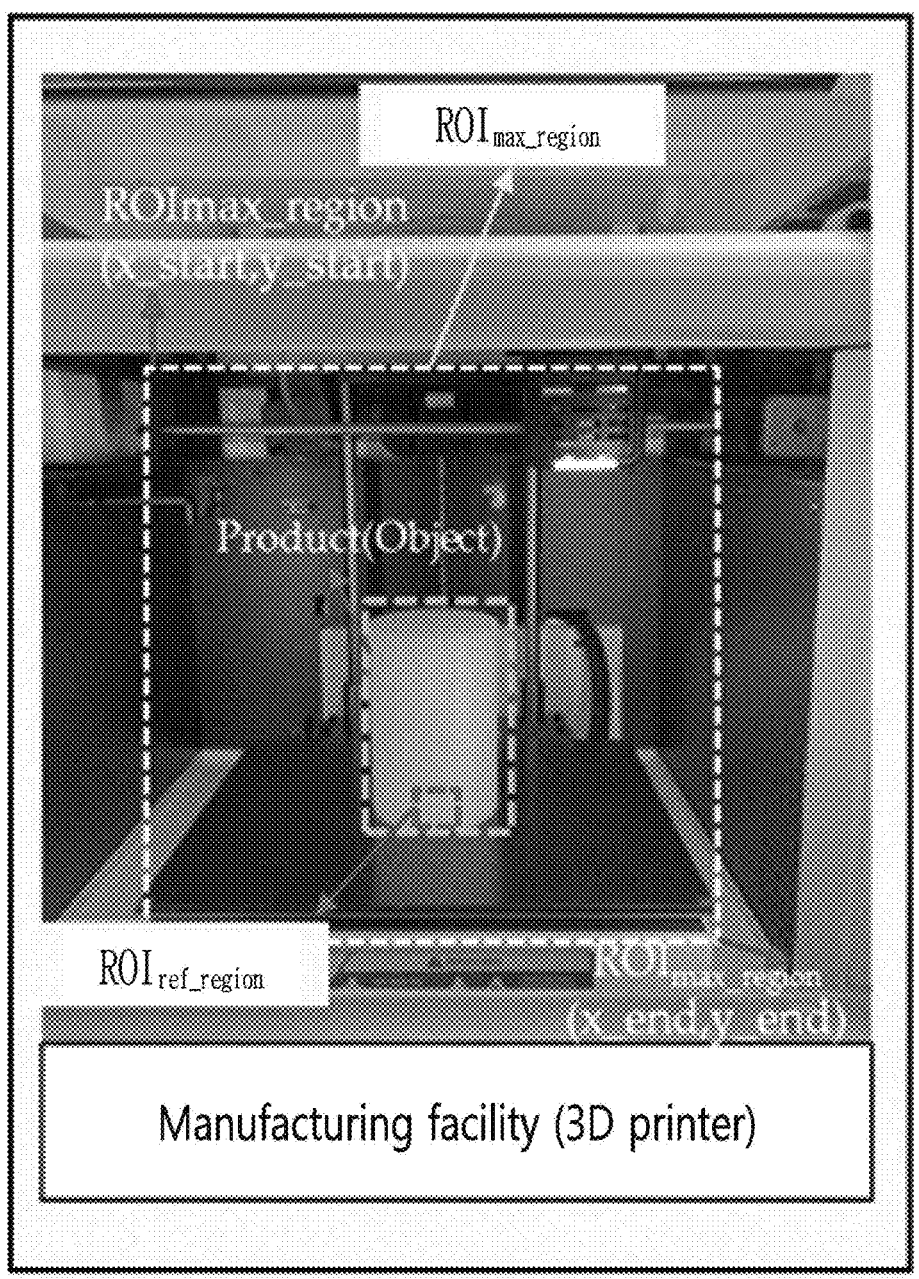
FIG. 5 is a diagram for explaining the HSV color selection step shown in FIG. 4.

FIG. 5 is a diagram for explaining the HSV color selection step shown in FIG. 4, and FIG. 6 is an algorithm diagram illustrating a detailed flow of the HSV color selection step shown in FIG. 4.

Referring to FIG. 6, the object detector 123 sets a reference ROI ($ROI_{ref\_region}$) and a maximum ROI ($ROI_{max\_region}$) to recognize the color and location information of the product based on the HSV color space.

First, the object detection unit 123 sets a maximum ROI ($ROI_{max\_region}$) As shown in FIG. 5, the maximum ROI ($ROI_{max\_region}$) may be set to be larger than the maximum size of a product produced from a manufacturing facility in a frame.

The object detector 123 sets the location information of the maximum ROI ($ROI_{max\_region}$) from the coordinates (x_start, y_start) of the upper left corner and the coordinates (x_end, y_end) of the lower right corner of the bounding box constituting the maximum ROI ($ROI_{max\_region}$).

After the production of the product is completed using the manufacturing facility, one frame is input to the object detector 123 from the video image data photographed by the vision camera.

The object detector 123 sets the location information of the reference ROI ($ROI_{ref\_region}$) from the coordinates (x_start, y_start) of the upper left corner and the coordinates (x_end, y_end) of the lower right corner of the bounding box constituting the maximum ROI ($ROI_{max\_region}$) in the frame. As shown in FIG. 5, the reference ROI ($ROI_{ref\_region}$) may be set around the center of the bottom of the manufacturing facility, which is a reference location where additive manufacturing for producing a product is first started.

The object detector 123 sets location information of the reference ROI ($ROI_{ref\_region}$) within the frame, and converts the reference ROI ($ROI_{ref\_region}$) from the RGB color space to the HSV color space.

The object detector 123 extracts an HSV value, which is reference color data for identifying a color of a product, from a reference ROI ($ROI_{ref\_region}$) within the frame.

As described above, the reason for setting the reference ROI ($ROI_{ref\_region}$) in the object detector 123 is to solve the problem that the user has to set the HSV threshold each time because the color of the product is different depending on the order.

The object detector 123 sets an HSV upper bound threshold value and an HSV lower bound threshold value based on the HSV value of the reference ROI ($ROI_{ref\_region}$). Since the color of the product may change due to lighting interference or a change in lighting conditions, the object detector 123 may set the HSV upper bound threshold value and the HSV lower bound threshold value based on the extracted HSV value. The HSV upper bound threshold value and the HSV lower bound threshold may be set to a maximum value and a minimum value of a range capable of expressing the corresponding HSV value.

The object detector 123 stores location information of a reference ROI ($ROI_{ref\_region}$), an HSV upper bound threshold value, and an HSV lower bound threshold value.

Figure 7:
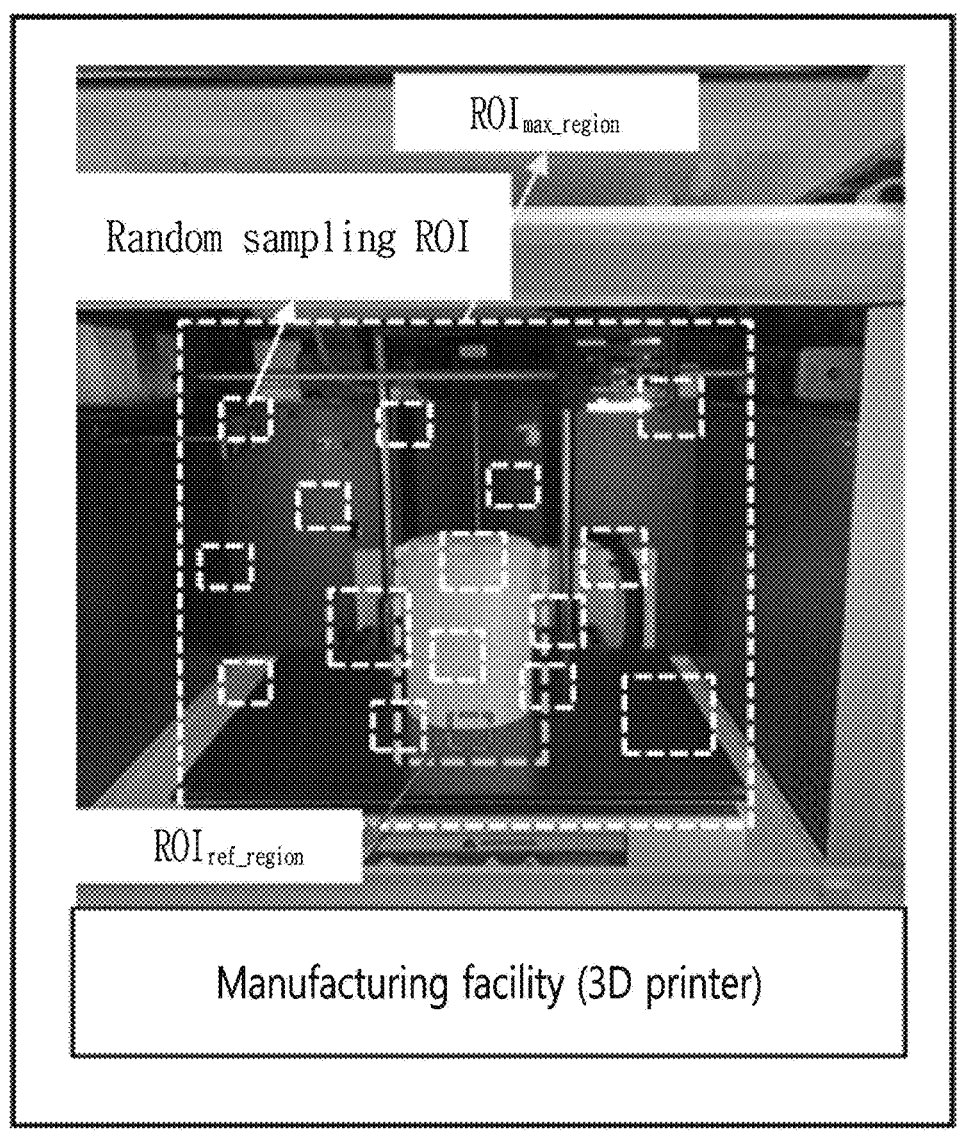
FIG. 7 is a diagram for explaining ROI random sampling shown in FIG. 4.

FIG. 7 is a diagram for explaining ROI random sampling shown in FIG. 4, and FIG. 8 is an algorithm diagram for explaining the detailed flow of the ROI random sampling and HSV similarity comparison steps shown in FIG. 4.

ROI random sampling is used to automatically recognize the shape of an object from complex and volatile external environmental changes such as shadows, reflections, or light interference in factories. ROI random sampling is advantageous for accurate localization and recognition of an object because it responds quickly and easily to some changes in the lighting environment without user intervention or prior learning.

Referring to FIG. 8, the object detector 123 sets the maximum number of random sampling ROIs ($ROI_{sampling\_max}$) as the maximum sampling number. The random sampling ROI represents a randomly sampled ROI around the reference ROI ($ROI_{ref\_region}$) within the maximum ROI ($ROI_{max\_region}$). As shown in FIG. 7, the random sampling ROIs of the maximum sampling number may be set within the maximum ROI ($ROI_{max\_region}$).

The object detector 123 allocates index values from 0 to (maximum sampling number−1) to the random sampling ROIs of the maximum sampling number, respectively.

The object detector 123 performs the following process for each random sampling ROI ($ROI_{sampling\_i}$) from a random sampling ROI having an index value of 0 to a random sampling ROI having an index value of (maximum sampling number−1).

The object detector 123 extracts the location information of the random sampling ROI ($ROI_{sampling\_i}$) from the coordinates (x_start, y_start) of the upper left corner and the coordinates (x_end, y_end) of the lower right corner of the bounding box constituting the maximum ROI ($ROI_{max\_region}$).

The object detector 123 converts an RGB color to an HSV color for the random sampling ROI ($ROI_{sampling\_i}$), and extracts an HSV value from the random sampling ROI ($ROI_{sampling\_i}$).

The object detector 123 calculates the HSV color similarity between the random sampling ROI ($ROI_{sampling\_i}$) and the reference ROI ($ROI_{ref\_region}$). The HSV color similarity indicates the degree of color matching between the HSV color of the random sampling ROI ($ROI_{sampling\_i}$) and the HSV color of the reference ROI ($ROI_{ref\_region}$). The HSV color similarity may be calculated through the distances for each of H, S, and V between the HSV color of the random sampling ROI ($ROI_{sampling\_i}$) and the HSV color of the reference ROI ($ROI_{ref\_region}$). The similarity threshold value for comparing the similarity means a boundary value for determining whether the HSV color similarity is the same.

The object detector 123 searches for the HSV value of the random sampling ROI ($ROI_{sampling\_i}$) and the HSV value of the reference ROI ($ROI_{ref\_region}$), and calculates the distance for each of H, S, and V between the random sampling ROI ($ROI_{sampling\_i}$) and the reference ROI ($ROI_{ref\_region}$). Distance for each of H, S, and V between the random sampling ROI ($ROI_{sampling\_i}$) and the reference ROI ($ROI_{ref\_region}$) may be calculated as in Equation 1.

$$h = \frac{\min(|h1-h0|, 360-|h1-h0|)}{180.0} \quad \text{(Equation 1)}$$

$$s = |s1 - s0|$$

$$v = \frac{|v1 - v0|}{255.0}$$

$$\text{distance} = \sqrt{h^2 + s^2 + v^2}$$

Here, h1, s1, and v1 are H, S, and V values of the reference ROI ($ROI_{ref\_region}$), and h0, s0, and v0 represent H, S, and V values of the random sampling ROI ($ROI_{sampling\_i}$). H has a range from 0 to 360°, and the distance between two colors can be calculated from 0 to 1. S is in the 0-1 range. V has a range from 0 to 255 and has a value from 0 to 1 when divided by 255. When the distance value of the HSV color similarity is close to 0 compared to the similarity threshold ($Similarity_{threshold}$), it means that the HSV value of the reference ROI ($ROI_{ref\_region}$) and the HSV value of the random sampling ROI ($ROI_{sampling\_i}$) are most similar.

The object detector 123 sets the HSV upper bound threshold value and the HSV lower bound threshold value of the random sampling ROI ($ROI_{sampling\_i}$) if the calculated distance is less than or equal to the similarity threshold ($Similarity_{threshold}$) and adds the HSV value of the random sampling ROI ($ROI_{sampling\_i}$), the HSV upper bound threshold value, and the HSV lower bound threshold value of the random sampling ROI ($ROI_{sampling\_i}$) to the temporary list ($ROI_{TempList}$). In this way, the temporary list ($ROI_{TempList}$) includes the HSV values, the HSV upper bound threshold values, and the HSV lower bound threshold values of the random sampling ROIs with high HSV color similarity to the reference ROI ($ROI_{ref\_region}$).

Meanwhile, if the calculated distance is greater than a similarity threshold ($Similarity_{threshold}$), the object detector 123 performs HSV similarity comparison with respect to the random sampling ROI ($ROI_{sampling\_i}$+1) having an index value of 1 through the process described above.

In this way, HSV similarity comparison is performed up to the random sampling ROI whose index value is (maximum sampling number−1).

After the HSV similarity comparison is completed up to the random sampling ROI whose index value is (maximum sampling number−1), the merging operation of the random sampling ROIs in the temporary list ($ROI_{TempList}$) is performed.

In this way, the ROI random sampling detects the location of the product at various locations inside the manufacturing facility by randomly searching the ROI as much as the maximum number of ROIs.

The ROI random sampling and HSV similarity comparison steps extracts the location information of the searched random sampling ROI ($ROI_{sampling\_i}$), converts the RGB color of the random sampling ROI ($ROI_{sampling\_i}$) into HSV color, and extracts the HSV value of the random sampling ROI ($ROI_{sampling\_i}$), compares the HSV color similarity between the HSV color of the random sampling ROI ($ROI_{sampling\_i}$) and the HSV color of the reference ROI ($ROI_{ref\_region}$), and adds and stores the HSV value, the HSV upper bound threshold value, and the HSV lower bound threshold value of the random sampling ROI ($ROI_{sampling\_i}$) to the temporary list ($ROI_{TempList}$) if the distance between the HSV color of the random sampling ROI ($ROI_{sampling\_i}$) and the HSV color of the reference ROI ($ROI_{ref\_region}$) is less than or equal to the similarity threshold ($Similarity_{threshold}$).

Figure 9:
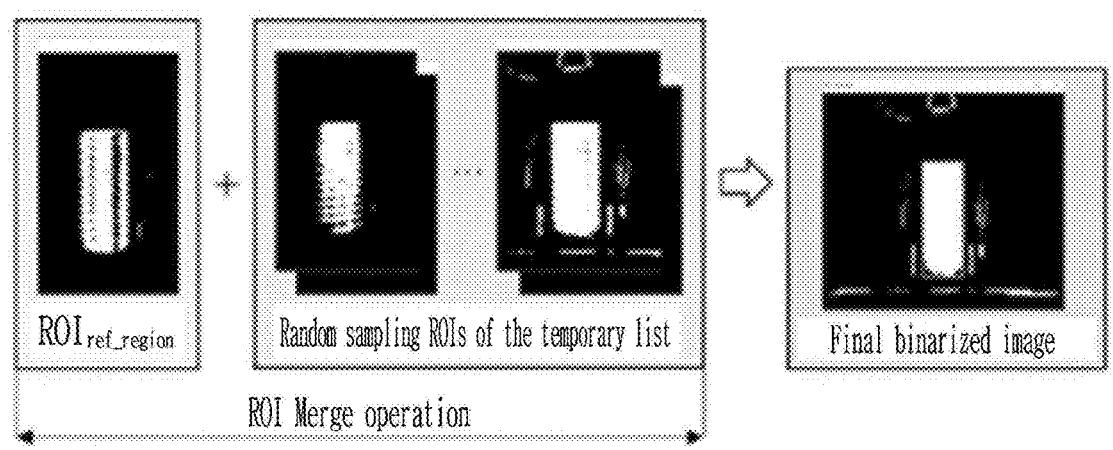
FIG. 9 is a diagram for explaining the ROI merging step shown in FIG. 4.

FIG. 9 is a diagram for explaining the ROI merging step shown in FIG. 4, and FIG. 10 is an algorithm diagram illustrating a detailed flow of the ROI merging step shown in FIG. 4.

First, referring to FIG. 10, the object detector 123 searches the maximum index length ($ROI_{TempList\_max}$) of the temporary list ($ROI_{TempList}$), and allocates index values from 0 to ($ROI_{TempList\_max}$−1) to the random sampling ROIs ($ROI_{TempList\_i}$) in the temporary list ($ROI_{TempList}$), respectively.

The object detector 123 performs the following process for each random sampling ROI ($ROI_{TempList\_i}$) from a random sampling ROI having an index value of 0 to a random sampling ROI having an index value of ($ROI_{TempList\_max}$−1).

The object detector 123 searches for an HSV value, an HSV upper bound threshold value, and an HSV lower bound threshold value of a random sampling ROI ($ROI_{TempList\_i}$) having an index value of 0 in the temporary list ($ROI_{TempList}$).

The object detector 123 performs image masking according to the HSV upper bound threshold value and the HSV lower bound threshold value of the random sampling ROI ($ROI_{TempList\_i}$) having an index value of 0. By image masking, the frame has two types of values, 0 and 1, and pixels with a value of 1 correspond to pixels within the HSV upper bound threshold value and HSV lower bound threshold value, which are the conditions specified in the masking, and pixels with a value of 0 correspond to pixels that do not satisfy the conditions specified in the masking.

The object detector 123 performs a bit operation between the image masked random sampling ROI ($ROI_{TempList\_i}$) and the reference ROI ($ROI_{ref\_region}$), and then performs a merge operation. The bit operation may be an OR bit operation. The merge operation may be an open and/or close operation.

Next, if the index value of the random sampling ROI ($ROI_{TempList\_i}$) is smaller than the maximum index length ($ROI_{TempList\_max}$), the object detector 123 increases the index value by 1 and then performs bit operation and merge operations of the random sampling ROI ($ROI_{TempList\_i}$) and the reference ROI ($ROI_{ref\_region}$) by performing the process described above for the random sampling ROI ($ROI_{TempList\_i}$) of the corresponding index value.

In this way, when the merge operation is completed for all random sampling ROIs ($ROI_{TempList\_i}$) in the temporary list ($ROI_{TempList}$), one final binarized image is generated.

The object detector 123 generates a bounding box of the binarized image, and recognizes location information of the object from the bounding box.

After recognizing the location information of the object, it goes to the next step, that is, the object measurement step.

As shown in FIG. 9, the ROI merging step involves image-masking all random sampling ROIs ($ROI_{TempList\_i}$) in the temporary list ($ROI_{TempList}$), performs bit operation and a merge operation between each of image-masked random sampling ROIs ($ROI_{TempList\_i}$) and reference ROI ($ROI_{ref\_region}$), and then finally generates one binarized image.

This ROI merge operation is used to more accurately detect the shape (color, location) of a product from interference of light based on HSV color in the real environment.

The object measurement step is a step to measure the shape information of the product.

For example, the size of the product may be calculated as in Equation 2.

$$\text{PixelPerMetric} = \text{object width (measured in pixel)} / \text{reference object width}$$

$$\text{Height} = dH/\text{PixelPerMetric}$$

$$\text{Width} = dW/\text{PixelPerMetric} \quad \text{(Equation 2)}$$

In Equation 2, the PixelPerMetric is calculated by dividing the width value measured from the pixels of the binarized image detected by the object detector 123 by the width value of the reference object (product). The width value of the reference object indicates the size of the actual object (product) measured in advance.

The width and height of the actual object (product) may be calculated by dividing the horizontal length (dW) and vertical length (dH) of the bounding box of the object by the PixelPerMetric, respectively. The horizontal length (dW) and vertical length (dH) of the bounding box may be detected through the method for automatically recognizing a location of an object based on the HSV color space.

The robot handler needs robot control information such as the loading location of the product, the unloading location to be transferred, the trajectory of the robot manipulator, and the grasping control information for the product transfer operation. The robot control information is included in the recipe to control grasping or manipulation.

The user must revise the recipe information whenever the shape of the product is changed. It takes considerable time and effort to teach the worker how to manually move the robot and modify the recipe for control. In order to solve this problem, in the embodiment of the present disclosure, a recipe is generated based on measurement information of a product extracted by object measurement and the robot is controlled according to the generated recipe.

Figure 11:
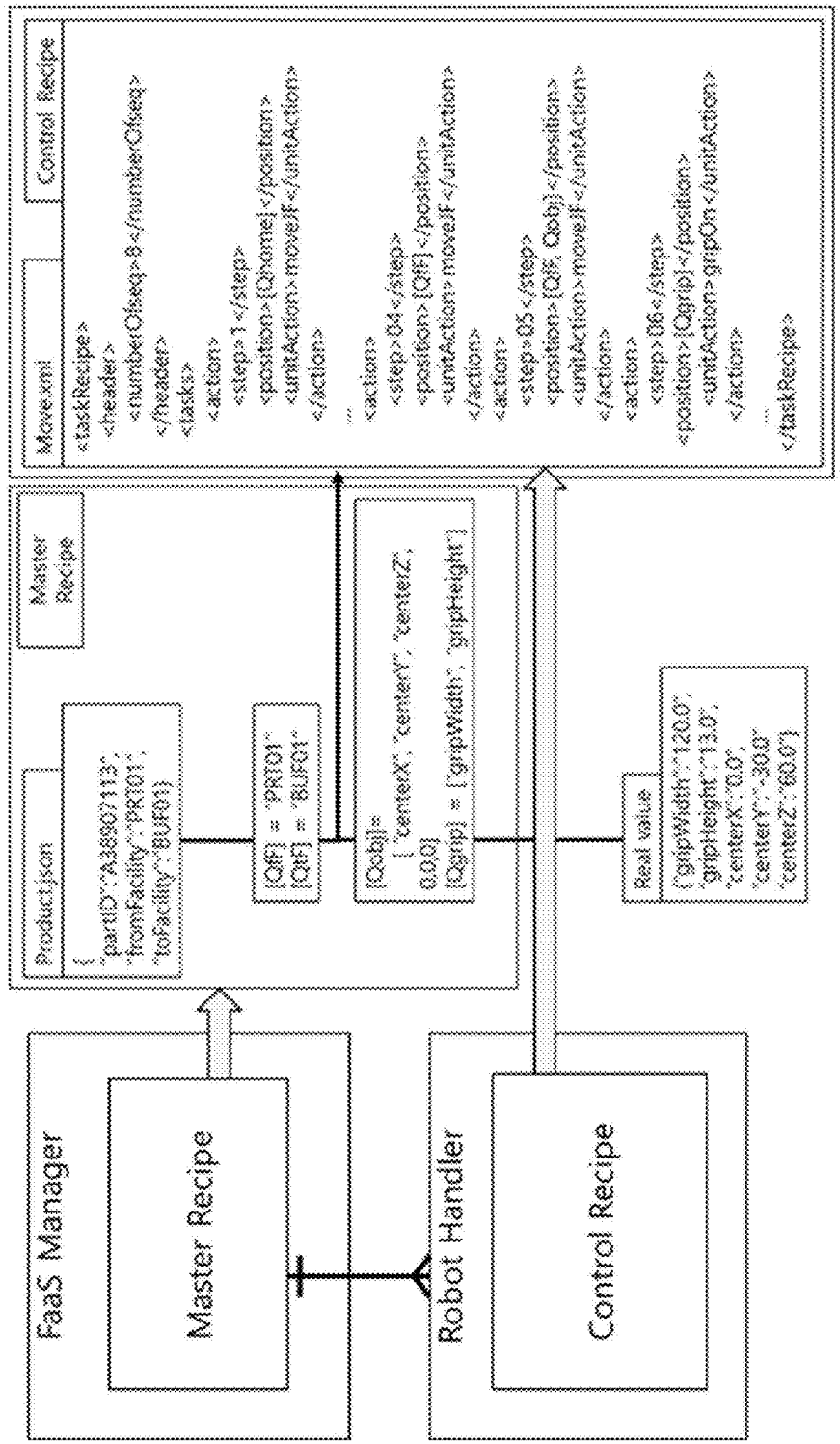
FIG. 11 is a diagram illustrating the type of recipe and detailed information for grasping of the robot.

FIG. 11 is a diagram illustrating the type of recipe and detailed information for grasping of the robot.

In this description, a specific manufacturing facility (e.g., a robot handler) is dealt with, and the specific manufacturing facility is executed in two stages of a master recipe and a control recipe.

The motion recipe information for grasping the robot consists of the master recipe, a Product.json file (example of the master recipe file name), and the control recipe, Move.xml file (the example of the control recipe file name). The master recipe includes basic characteristic information and process information of the product, and the control recipe includes robot grasping trajectory information.

The master recipe generated through location measurement of the object is transmitted to the robot handler, and may include product ID (partID), loading equipment information at origin (fromFacility), and unloading equipment information at a destination (toFacility).

[QfF] and [QtF] of the master recipe convert the loading equipment information at the origin and unloading equipment information at the destination into equipment parameters. [Qobj] of the master recipe is calculated as the center point of the object by [Qobj]. [Qgrip] of the master recipe reflects the horizontal and vertical length information of the product extracted by object measurement.

The control recipe is managed within the robot handler. The <header> of the control recipe indicates the total number of steps in <numberOfseq>, and the <tasks> indicates task information for each step. The <step> indicates the work progress stage, the <position> indicates the target location of the trajectory that the robot should move, and the <unitAction> indicates the robot unit that performs tasks such as moving and grabbing.

The robot handler transfers the product through the master and control recipes.

FIGS. 12 to 17 are diagrams illustrating results of applying each step of the method for automatically recognizing location of object according to an embodiment of the present disclosure to a test product, respectively.

Figure 12:
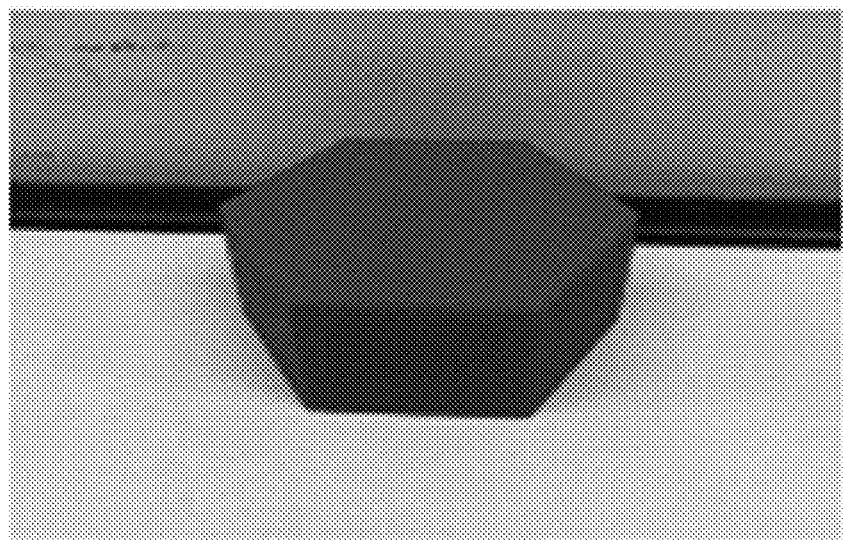
FIGS. 12 to 17 are diagrams illustrating results of applying each step of the method for automatically recognizing a location of an object according to an embodiment of the present disclosure to a test product, respectively.

First, a product as shown in FIG. 12 is produced by a 3D printer, which is a manufacturing facility.

Figure 13:
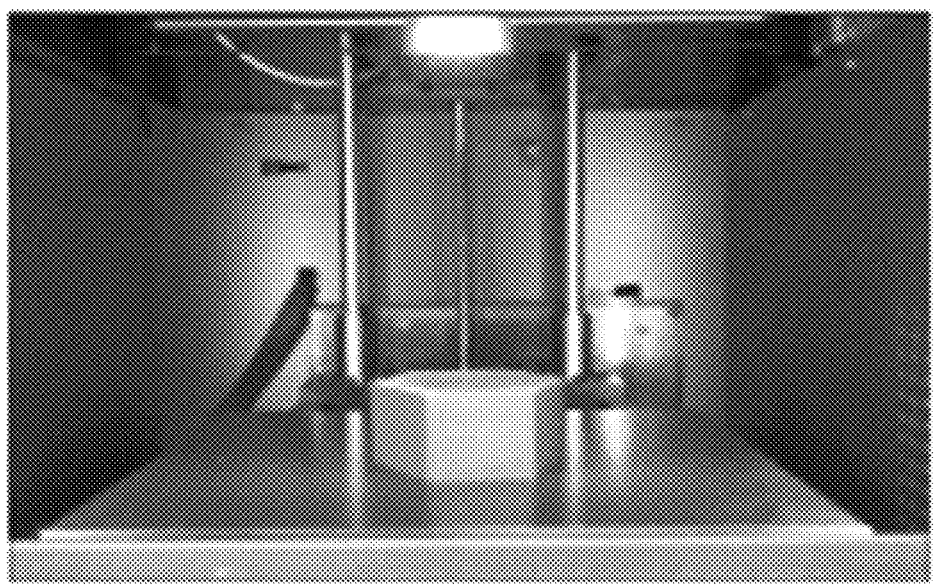
Figure 14:
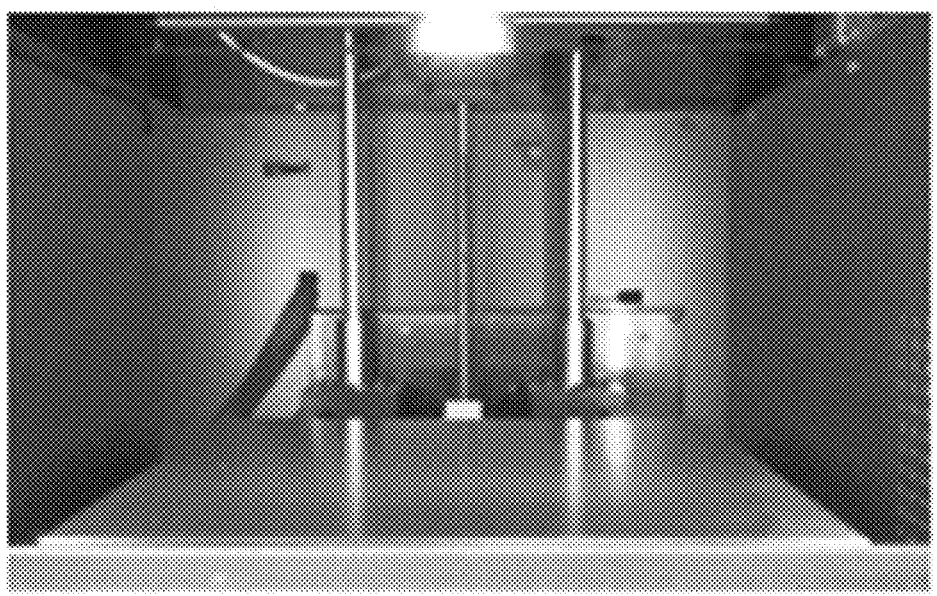

The products that have been produced by the 3D printer are photographed through a vision camera. Then, a foreground image as shown in FIG. 13 is generated. In this case, the background image inside the 3D printer is shown in FIG. 14.

Figure 15:
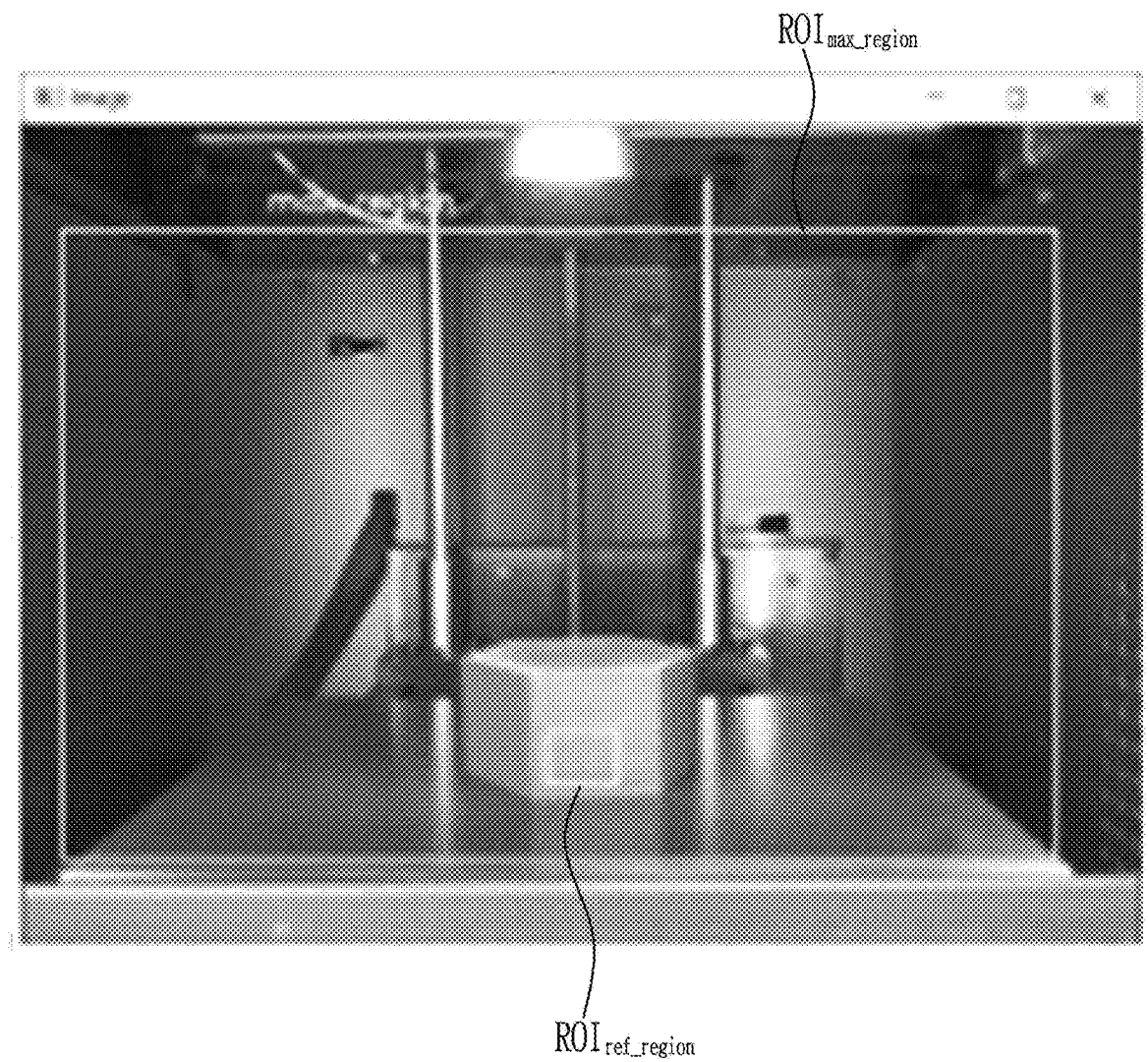

Next, as shown in FIG. 15, the reference ROI ($ROI_{ref\_region}$) and the maximum ROI ($ROI_{max\_region}$) for HSV color picking are set through the HSV color picking algorithm shown in FIG. 6 for the foreground image shown in FIG. 13, the HSV upper bound threshold value and the HSV lower bound threshold value of the reference ROI ($ROI_{ref\_region}$) are set.

Figure 16:
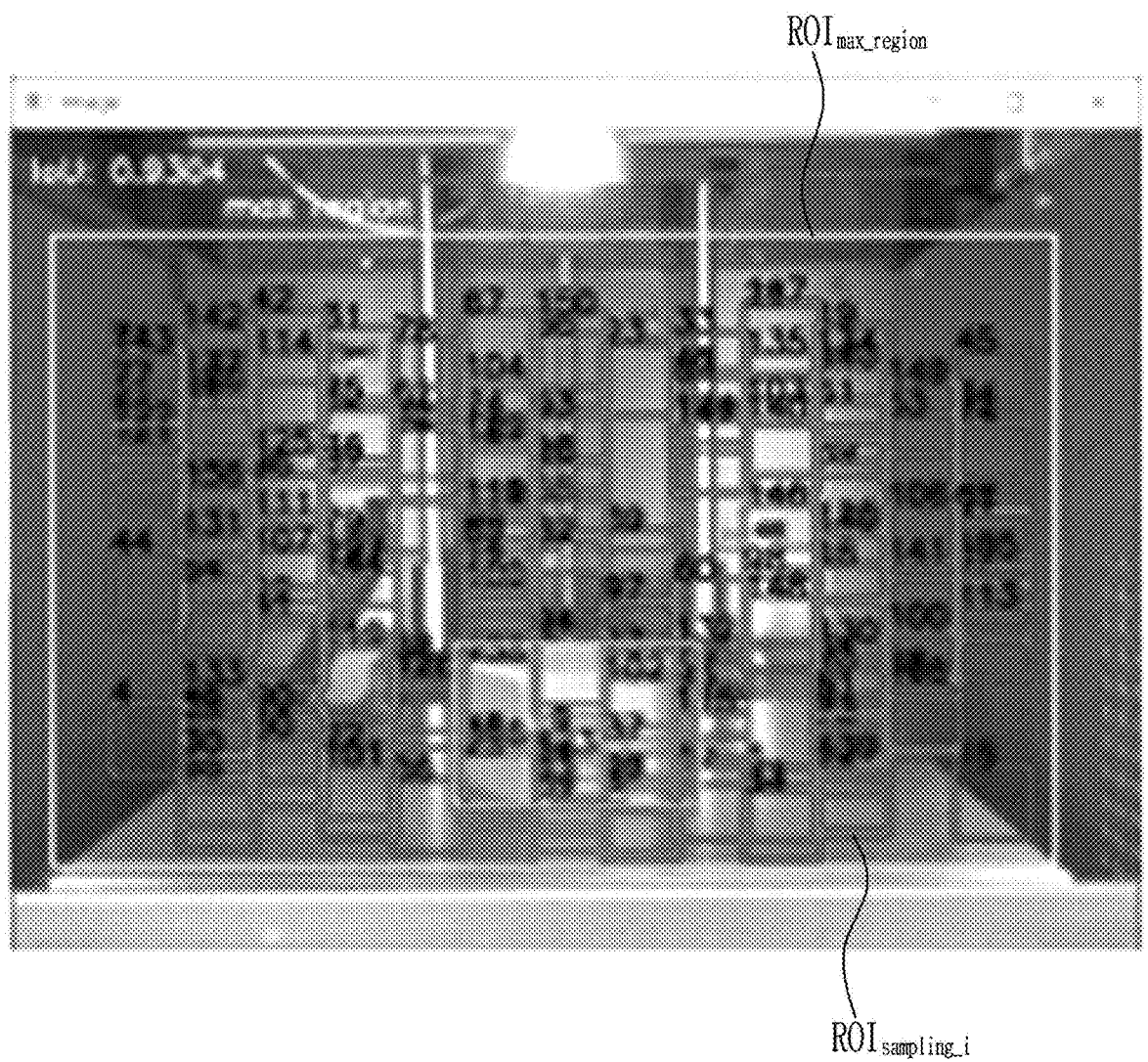

Next, as shown in FIG. 16, an ROI random sampling process is performed. In this case, the maximum number of random sampling ROIs ($ROI_{sampling\_i}$) may be arbitrarily set and changed by the user.

An HSV similarity comparison operation is performed on the random sampling ROIs ($ROI_{sampling\_i}$) shown in FIG. 16 through the algorithm shown in FIG. 8, and as a result, the HSV value, HSV upper bound threshold value and HSV lower boundary threshold value of the random sampling ROI ($ROI_{sampling\_i}$) having the HSV color similarity to the reference ROI ($ROI_{ref\_region}$) are added to the temporary list ($ROI_{TempList}$).

Figure 17:
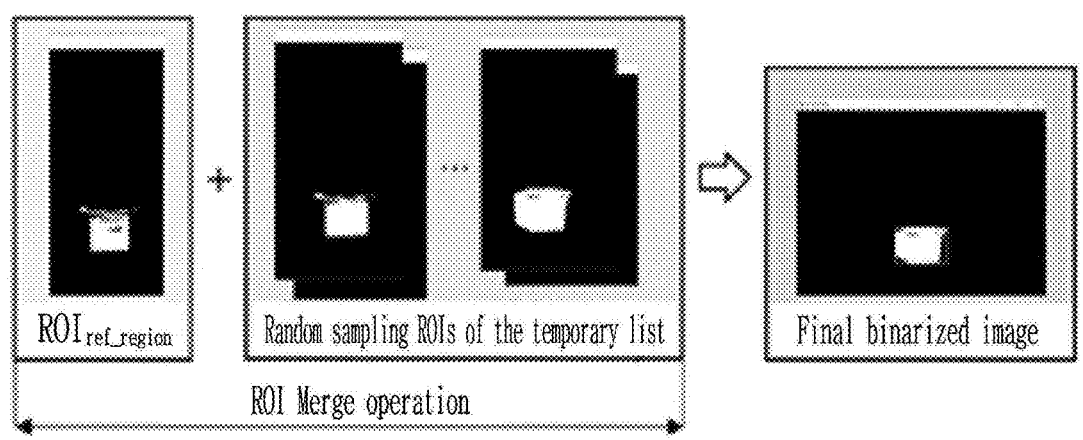

Next, as shown in FIG. 17, after image masking of all random sampling ROIs ($ROI_{TempList\_i}$) in the temporary list ($ROI_{TempList}$), a bit operation between the image masked random sampling ROI ($ROI_{TempList\_i}$) and the reference ROI ($ROI_{ref\_region}$) is performed. Thereafter, the bit operated ROIs are merged to finally generate one binarized image.

The location information and shape information of the product are calculated from the generated binarized image, and a recipe for controlling the robot is generated based on the location information and shape information of the product.

Figure 18:
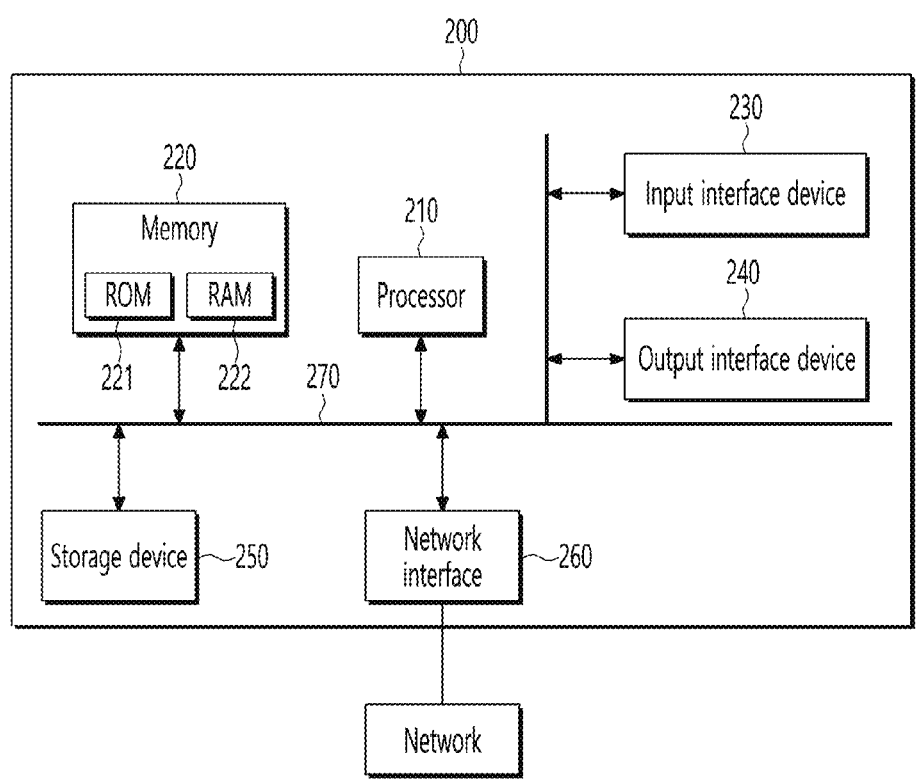
FIG. 18 is a diagram illustrating an apparatus for automatically recognizing a location of an object according to another exemplary embodiment.

FIG. 18 is a diagram illustrating an apparatus for automatically recognizing a location of object according to another exemplary embodiment.

Referring to FIG. 18, the apparatus for automatically recognizing location of the object 200 may represent a computing device in which the method for automatically recognizing the location of an object described above is implemented.

The apparatus for automatically recognizing a location of an object 200 includes at least one of processor 210, a memory 220, an input interface device 230, an output interface device 240, a storage device 250, and a network interface device 260. Each of the components may be connected by a common bus 270 to perform communication with each other. In addition, each of the components may be connected through an individual interface or a separate bus centering on the processor 210 instead of the common bus 270.

The processor 210 may be implemented as various types such as an application processor (AP), a central processing unit (CPU), a graphics processing unit (GPU), etc., and may be any semiconductor device that executes a command stored in the memory 220 or the storage device 250. The processor 210 may execute a program command stored in at least one of the memory 220 and the storage device 250. The processor 210 stores program commend for implementing at least some functions of the data aggregator 121, the data converter 122, the object detector 123, the data analyzer 124, the data controller 125, the data manager 126, and the data monitor 127 described with reference to FIG. 1 in the memory 220, and may control to perform the operation described with reference to FIGS. 1 to 17.

The memory 220 and the storage device 250 may include various types of volatile or non-volatile storage media. For example, the memory 220 may include a read-only memory (ROM) 221 and a random access memory (RAM) 222. The memory 220 may be located inside or outside the processor 210, and the memory 220 may be connected to the processor 210 through various known means.

The input interface device 230 is configured to provide data to the processor 210.

The output interface device 240 is configured to output data from the processor 210.

The network interface device 260 may transmit or receive signals with an external device through a wired network or a wireless network.

According to the embodiment, by providing a simple and powerful method for automatically recognizing a location of an object based on an HSV color space for external environmental changes such as lighting interference, shadows, reflections, and lighting conditions in a variable manufacturing environment, shape information of the product can be extracted quickly and automatically without user intervention and prior knowledge (learning and prior setting, etc.).

In addition, it can contribute to automation and intelligence of robots that can operate on their own without human intervention by automatically generating recipe information of the robot based on the extracted information and controlling the robot according to the recipe information.

It is also expected to be applicable to various domains that can respond to changes in the external environment in real time.

At least some of the method for automatically recognizing a location of an object according to an embodiment of the present disclosure may be implemented as a program or software executed in a computing device, and the program or software may be stored in a computer-readable medium.

In addition, at least some of the method for automatically recognizing a location of an object according to the embodiment of the present disclosure may be implemented as hardware that can be electrically connected to the computing device.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for automatically recognizing a location of an object so that a robot can grasp and transfer the object in an apparatus for automatically recognizing a location of an object, the method comprising:
   obtaining one frame from image data of a product produced by a manufacturing facility;
   setting a reference region of interest (ROI) and a maximum ROI in the frame, wherein a plurality of random sampling ROIs are sampled randomly by a set number around the reference ROI within the maximum ROI;
   detecting location and shape information of the product based on a hue, saturation, value (HSV) color space using the frame;
   generating a recipe for the robot to grasp and transfer the product based on the location and shape information of the product; and
   transmitting the recipe to the robot.

2. The method of claim 1, wherein the detecting includes:
   searching random sampling ROIs having high HSV color similarity to the reference ROI by comparing HSV color values between the reference ROI and each of the plurality of random sampling ROIs; and
   generating one final product image by using the searched random sampling ROIs.

3. The method of claim 2, wherein the searching includes:
extracting the HSV color value of the reference ROI;
extracting an HSV color value for each of the plurality of random sampling ROIs;
calculating a distance between the HSV color value of the reference ROI and the HSV color value of each random sampling ROI; and
determining random sampling ROIs having the calculated distance equal to or less than a predetermined similarity threshold as the random sampling ROIs having high HSV color similarity to the reference ROI.

4. The method of claim 2, wherein the searching includes setting an HSV upper bound threshold value and an HSV lower bound threshold value for each of the HSV color values of the random sampling ROIs having high HSV color similarity to the reference ROI.

5. The method of claim 4, wherein the generating includes:
performing image masking according to the HSV upper bound threshold value and the HSV lower bound threshold value of the corresponding random sampling ROI, for each of the random sampling ROIs having high HSV color similarity to the reference ROI; and
generating a binarized image for the product image by performing a bit operation and a merge operation on the image masked random sampling ROIs and the reference ROI.

6. The method of claim 2, wherein the detecting includes calculating a size of the product from the product image.

7. The method of claim 6, wherein the calculating the size of the product includes:
calculating width and height of the product by dividing a horizontal length and a vertical length of a bounding box representing the product in the product image by pixels per metric, respectively; and
the pixel per metric indicates a value obtained by dividing a width value of the product measured in the frame by a width value of the product measured in advance.

8. The method of claim 2, wherein the detecting further includes, before the searching, converting the reference ROI in the frame from colors in an RGB color space to colors in an HSV color space.

9. An apparatus for automatically recognizing location of an object that automatically recognizes a location of the object so that a robot can grasp and transfer the object, the apparatus comprising:
at least one processor;
a memory having instructions stored thereon, which, when executed by the at least one processor, cause the at least one processor to perform:
a data aggregator that collects image data of a product produced by a manufacturing facility;
a data converter that obtains one frame from the image data;
an object detector that sets a reference region of interest (ROI) and a maximum ROI in the frame, and detects the location of the product based on a hue, saturation, value (HSV) color space using the frame, wherein a plurality of random sampling ROIs are sampled randomly by a set number around the reference ROI within the maximum ROI; and
a data analyzer that extracts shape information of the product detected by the object detector.

10. The apparatus of claim 9, wherein the object detector searches random sampling ROIs having high HSV color similarity to the reference ROI through comparison of HSV color values between the reference ROI and each of the plurality of random sampling ROIs, and generates one final product image by using the searched random sampling ROIs.

11. The apparatus of claim 10, wherein the object detector calculates a distance between the HSV color value of the reference ROI and the HSV color value of each of the random sampling ROIs, and determines random sampling ROIs having the calculated distance equal to or less than a predetermined similarity threshold as the random sampling ROIs having high HSV color similarity to the reference ROI.

12. The apparatus of claim 11, wherein the object detector calculates the distance using the difference between the H color values of the reference ROI and the each of random sampling ROIs, a difference between an S color values of the reference ROI and each of the random sampling ROIs, and a difference between the V color values of the reference ROI and each of the random sampling ROIs.

13. The apparatus of claim 10, wherein the object detector sets an HSV upper bound threshold value and an HSV lower bound threshold value for each of the HSV color values of the random sampling ROIs having high HSV color similarity to the reference ROI.

14. The apparatus of claim 13, wherein the object detector performs image masking according to the HSV upper bound threshold value and the HSV lower bound threshold value of the corresponding random sampling ROI, for each of the random sampling ROIs having high HSV color similarity to the reference ROI, and generates a binarized image for the product image by performing a bit operation and a merge operation on the image masked random sampling ROIs and the reference ROI.

15. The apparatus of claim 10, wherein the data analyzer calculates a size of the product from the product image.

16. The apparatus of claim 10, wherein the object detector converts the reference ROI in the frame from colors in an RGB color space to colors in an HSV color space before the comparison.

17. The apparatus of claim 10, wherein the at least one processor further performs a data controller that generates a recipe for the robot to grasp and transfer the product based on the location and shape information of the product, and controls the robot according to the recipe.

* * * * *